United States Patent [19]
Miller

[11] 3,840,985
[45] Oct. 15, 1974

[54] METHOD OF MAKING WATER BED HEATER
[75] Inventor: Robert C. Miller, Madison, Conn.
[73] Assignee: Safeway Products Inc., Middletown, Conn.
[22] Filed: Sept. 17, 1973
[21] Appl. No.: 397,956

Related U.S. Application Data
[62] Division of Ser. No. 203,535, Dec. 1, 1971, Pat. No. 3,790,753.

[52] U.S. Cl................................. 29/611, 156/309
[51] Int. Cl. ........................................ H05b 3/00
[58] Field of Search ...... 29/611, 610; 156/309, 288, 156/285; 219/200, 201, 212, 213, 217, 345, 528, 548, 549, 544

[56] References Cited
UNITED STATES PATENTS

| | | | |
|---|---|---|---|
| 2,018,512 | 10/1935 | DeLaney et al. ................. | 219/528 |
| 2,715,674 | 8/1955 | Abbott et al. ................... | 219/46 |
| 3,041,441 | 6/1962 | Elbert et al. .................... | 219/345 |
| 3,178,560 | 4/1965 | Mapp et al. ..................... | 219/528 |
| 3,547,725 | 12/1970 | Shomphe et al. ................ | 29/611 X |

Primary Examiner—Charles W. Lanham
Assistant Examiner—Victor A. DiPalma

[57] ABSTRACT

Two sheets of a styrene-butadiene (SBR) type rubber molded together totally encapsulating a heating wire network and a crimp-set overheat thermostat provide a greatly improved water-proof water bed heater. By incorporating a hydrostatic pressure resisting shield or cover for protection of the crimp-set thermostat, and by using uncured styrene-butadiene type rubber, an efficient, economical water bed heater is manufactured by vulcanization under high fabrication pressures which exceed the normal thermostat pressure tolerances.

8 Claims, 10 Drawing Figures

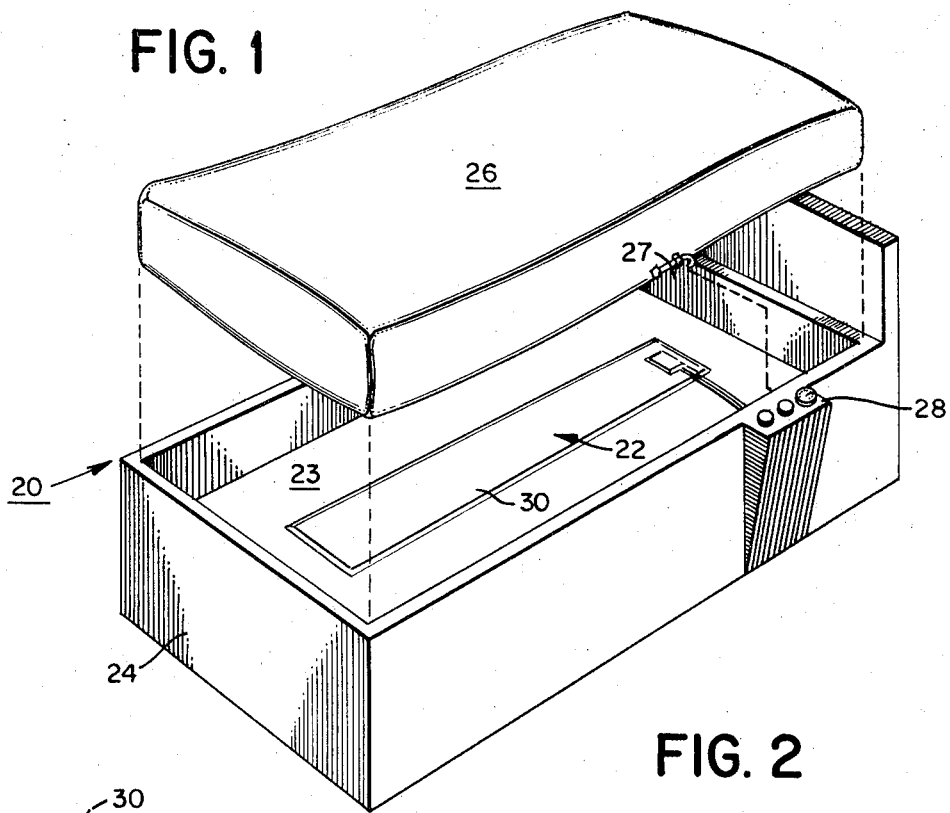
FIG. 1
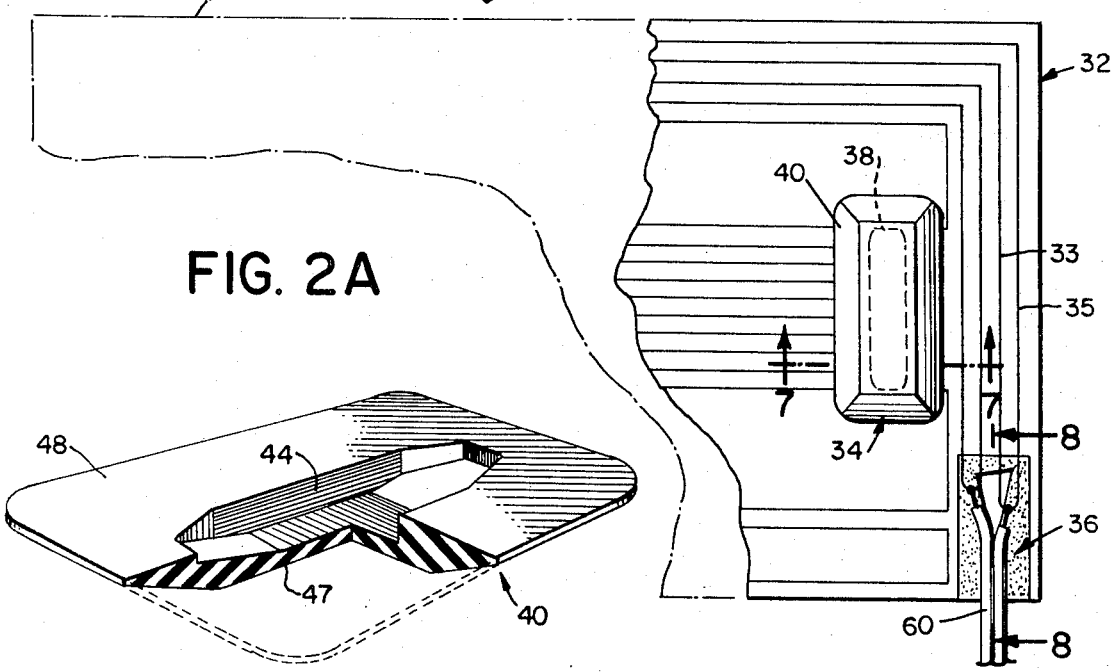
FIG. 2
FIG. 2A

METHOD OF MAKING WATER BED HEATER

CROSS-REFERENCE TO RELATED APPLICATION:

This application is a division of U.S. Application Ser. No. 203,535, filed Dec. 1, 1971, now U.S. Pat. No. 3,790,753.

BACKGROUND OF THE INVENTION

1. Field of the Invention

This invention relates to water bed heaters, and more particularly, thermostat-controlled cycling water bed heaters.

With the relatively recent introduction of water beds and their continuing, spiraling popularity, the need for an efficient, safe, water bed heater has, likewise, increased. For maximum comfort in sleeping on a water bed, a water bed heater is desirable since the temperature of the water bed itself would be at room temperature or about 72° F. Since a normal body temperature is 98.6° F., an individual sleeping on a room temperature water bed would find it cold and undesirable.

2. The Prior Art

In order to provide a water bed that optimizes comfort while minimizing individual controlling effort and assuring safe operation, a water bed heater should incorporate both a thermostat for automatic cycling control of a preset temperature and a temperature cut-off thermostat. Generally, the prior art water bed heaters incorporate an expensive cut-off thermostat which has a bi-metallic switch and a sturdy housing to withstand high curing pressures. This type of thermostat produces a large undesirable bulge in the water bed heater. As a result, the water bed tends to snag on the thermostat and break, rip the thermostat off, and/or wear rapidly in the thermostat area. Although a less expensive, more streamlined crimp-set thermostat was desired, the prior art water bed heater manufacturers believed that a thermostat of the automatic reset "tubular" type, which is set by crimping and has a maximum pressure tolerance of 20–30 pounds per square inch (psi), could not withstand the 60–100 psi pressure levels of the curing or laminating process without complete failure or alteration of the reset temperature. Furthermore, the prior art water bed heaters were prone to separation of the laminated layers, which resulted in exposure of the heating wires to water from leaks or condensation. Consequently, this produced shorting of the thermostat and heating wires, along with complete electrical failure.

Attempts to eliminate the possibility of short circuit and heater breakdown in the prior art heaters have not been completely successful, and, as a result, no previous water bed heater has received the seal of approval from the well-known Underwriters' Laboratories.

OBJECTS OF THE INVENTION

Therefore, it is a primary object of this invention to provide a water bed heater having a low profile, efficient overheat thermostat integrally molded therein.

Another object of this invention is to provide a water bed heater with the characteristics defined above wherein an inexpensive, low pressure tolerance crimp-set thermostat is interconnected with the heating elements and molded into the heater at high pressure levels.

Another object of this invention is to provide a water bed heater with the characteristics defined above which virtually eliminates electrical short circuits and system failure during normal equipment use.

A further object of this invention is to provide a water bed heater with the characteristics defined above which meets all standards required for approval by Underwriters' Laboratories.

Another object of this invention is to provide a water bed heater with the characteristics defined above capable of relatively maintenance-free, cyclical control of water bed temperature.

Another object of this invention is to provide a water bed heater with the characteristics defined above which maximizes water bed comfort with a minimum of user effort.

Other and more specific objects will be apparent from the features, elements, combinations and operating procedures disclosed in the following detailed description and shown in the drawings.

SUMMARY OF THE INVENTION

The water bed heater of this invention is manufactured by positioning a sheet of styrene-butadiene (SBR) type rubber on a pin board and then forming the heating wire pattern directly on the rubber sheet, using the guide pins of the pin board. With the wiring pattern completed, a thermostat is connected directly to the wire network at that area where the wire density is maximum. Extra rubber layers are positioned about the thermostat and power supply wire connections. A specially formed hydrostatic pressure resistant cover or "pressure shield" is positioned over the thermostat, a bonding layer of adhesive mastic is applied by spraying, and then a second sheet of the styrene-butadiene rubber is positioned on the first sheet, completely covering the thermostat assembly and heating wire network.

The manufacture of the water bed heater of this invention is then completed by removing the pinboard and then surrounding the water bed heater with a flexible container having a vacuum port. A vacuum is drawn on the flexible container, causing all of the air in the container and in the heater assembly to be removed. Then, while maintaining the vacuum on the surrounding flexible container, the entire assembly is placed in an autoclave operating between 60 and 100 pounds per square inch at a temperature of 280° F. for a period of about 1 hour. This causes the SBR rubber to cure, with the embedded thermostat and heating wires being completely sealed therein. Since the heater assembly has been exposed to steam pressure and a vacuum environment during curing, the final cured heater is completely free of air bubbles or pockets.

Preferably, for cost reduction purposes, a relatively inexpensive crimp-set thermostat is employed. Since this type of thermostat is set by crimping the thermostat, these thermostats generally have a maximum pressure tolerance of 20 pounds per square inch. With this invention, the crimp-set thermostat is capable of remaining functional after being exposed to the steam pressure of 60–100 pounds per square inch in the autoclave, since the use of a hydrostatic pressure-resistant cover or shield prevents the elevated pressure from physically reaching the thermostat. Instead, the cover absorbs and deflects the high pressure forces to the area surrounding the thermostat.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

THE DRAWINGS

For a fuller understanding of the nature and objects of the invention, reference should be had to the following detailed description taken in connection with the accompanying drawings, in which:

FIG. 1 is an exploded perspective view showing the water bed heater of this invention employing a complete water bed assembly;

FIG. 2 is a greatly enlarged partially broken away top plan view of the water bed heater of FIG. 1, showing a thermostat pressure shield embedded therein;

FIG. 2A is an inverted cut-away sectional perspective view of the thermostat pressure shield shown in FIG. 2;

DETAILED DESCRIPTION

Figure 3:
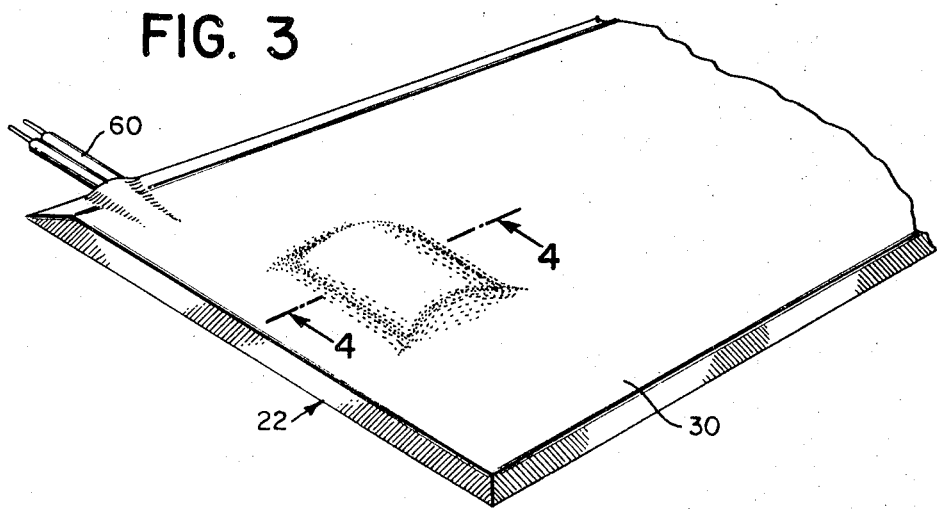
FIG. 3 is an enlarged perspective view of a portion of the water bed heater of FIG. 1.

In FIG. 1, a complete water bed assembly 20 is shown with water bed heater 22 positioned on a base 23 of a bed frame unit 24 directly below water bed 26. Water bed heater 22 is connected to temperature control box 28, where the water bed user can select the temperature at which he desires the water bed to be maintained. A fluid-type temperature sensor 27 is mounted along the bottom of water bed 26 to provide accurate measurement of the water temperature. Once the desired temperature has been set and water bed heater 22 has been properly connected, the heater continuously cycles, maintaining the temperature of water bed 26 within 1° F. of the desired temperature.

By providing a heater which allows an over-heat thermostat to be located directly below water bed 26 and positioned at substantially the hottest portion of the heating wire network, as will be described below, a more temperature sensitive heater is provided which quickly responds to temperature variations, to assure a positive heating shut-off whenever the water-bed heater itself exceeds the preset temperature. This eliminates the possibility of the heater starting a fire. Furthermore, in order to provide continuous, fail-safe operation, the water bed heater thermostat is molded within heater 22 having a very low profile. This prevents snagging and tearing of water bed 26.

Water bed heater 22 is manufactured from a styrene butadiene (SBR) type rubber caSing 30 which totally encapsulates a heating wire system 32, a thermostat assembly 34, and a power supply assembly 36, all shown in FIGS. 2 and 3. Heating wire system 32 is preferably manufactured with a continuous elongated length of stranded coupron wire, which has been arranged in a specific, non-overlapping pattern designed for maximum water bed heating.

Figure 4:
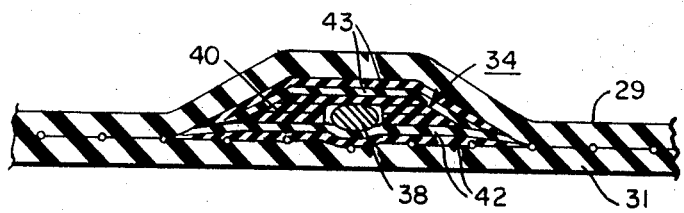
FIG. 4 is a cross-sectional side elevation view of the thermostat assembly of the water bed heater taken along the line 4—4 of FIG. 3.

Thermostat assembly 34, best seen in FIG. 4, comprises a crimp-set thermostat 38, a thermostat shield or cover 40, and a plurality of reinforcing plies 42 and 43. As can be readily seen in the cross-sectional view of FIG. 4, thermostat 38 is securely molded between a top layer 29 and a bottom layer 31 of the SBR type rubber of heater 22 without any pockets of air existing therebetween. The complete elimination of air between layers 29 and 31 throughout the entire heater 22 and especially in the area where thermostat 38 is secured is extremely important for the continued safe operation of heater 22. If pockets of air existed about thermostat 38, the insulating effect of the air would prevent thermostat 38 from properly sensing the temperature level of the heater itself and might possibly result in the overheating of the heater and the starting of a fire. By assuring that all air is eliminated, the sensitivity of thermostat 38 is substantially increased, thereby assuring safe operation.

Figure 7:
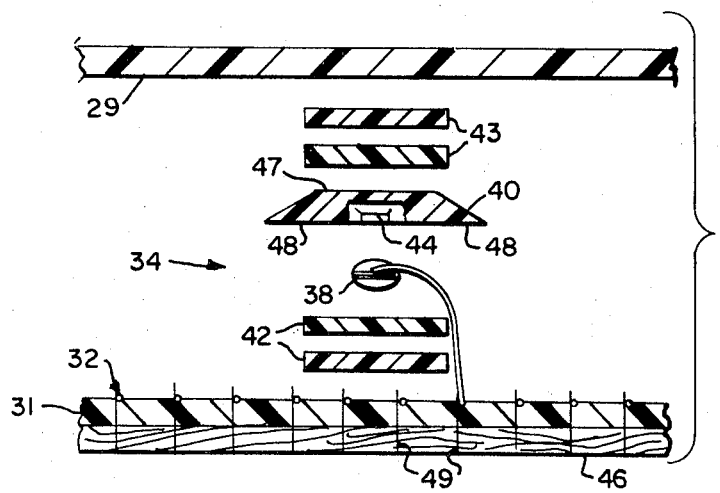
FIG. 7 is an exploded cross sectional side elevation view of the thermostat assembly of the water bed heater taken along the line 7—7 of FIG. 2.

Heater 22 is manufactured by first placing bottom layer 31 of the SBR type rubber on a pin board 46, shown in FIG. 7, with the pins 49 protruding through layer 31. The continuous heating wire assembly 32 is made by arranging the continuous elongated length of stranded wire in the desired pattern about pins 49 of pin board 46. As shown in FIG. 2, parallel heater wires 33 and 35 may be connected to the opposite line terminals, forming the heater wire pattern 32.

Figure 5:
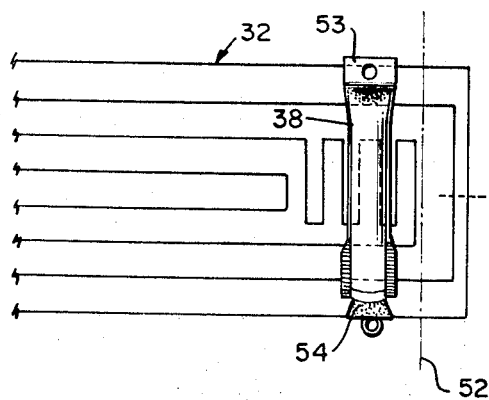
FIG. 5 is a top plan schematic view showing the thermostat in the preferred position in relation to the heating wire assembly prior to connection therewith.
Figure 6:
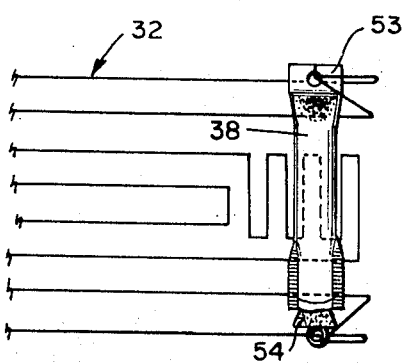
FIG. 6 is a top plan schematic view similar to that of FIG. 5 with the thermostat connected to the heating wire assembly.

Thermostat 38 is then connected to wire assembly 32 at an area where the wire density is maximum. The location of thermostat 38 and its interconnection to wire assembly 32 is best seen in FIGS. 5 and 6. One area of wire assembly 32 is provided with additional wire windings and thermostat 38 is placed directly in the center of this high wire density area. Wire assembly 32 is cut along line 50 and then folded along plane 52. The adjacent cut ends of the wires 33 and 35 are then respectively attached to end 53 and end 54 of thermostat 38, which thus completes the parallel circuit. Thermostat 38 is now electrically interconnected to wire assembly 32 and located in the highest wire density area.

Since thermostat 38 must prevent the overheating of wire assembly 32 and is partially insulated from the underlying wires, as will be seen below, the location of thermostat 38 in the area where the greatest amount of heat will be generated at any particular time is required in order to provide accurate temperature sensing and effective control of heating wire assembly 32.

Once thermostat 38 has been attached to heating wire assembly 32, the thermostat assembly 34, best seen in FIG. 7, is completed. Reinforcing or patch plies 42 are positioned on bottom layer 31 in direct contact with the desired high wire density area of wire assembly 32. Thermostat 38 is then positioned on reinforcing plies 42 and is substantially enveloped by hydrostatic pressure-resistant cover 40. Cover 40 comprises either a single preformed uncured rubber piece as shown in FIG. 2A or a plurality of uncured rubber layers of suitable configuration, as shown in FIG. 4.

The thermostat assembly is then completed by the positioning of reinforcing plies 43 on top of cover 40. Preferably, reinforcing plies 42 and 43 comprise nylon reinforced uncured neoprene, in order to impart the desired strength to thermostat assembly 34, and may have suitably beveled edges, as shown in FIG. 4.

Hydrostatic pressure deflection cover 40 comprises a cavity 44, which has a width slightly greater than that of thermostat 38 and a depth slightly less than the thickness of thermostat 38. As a result, when uncured cover 40 is placed over thermostat 38, the only contact between cover 40 and thermostat 38 is along the top surface of thermostat 38, and there is a slight gap between lower surface 48 of cover 40 and the upper surface of the reinforcing plies 42. During the rubber curing process, which is fully discussed below, the gap between lower surface 48 of cover 40 and reinforcing plies 42 provides a path for the air surrounding thermostat 38 to be completely withdrawn before cover 40 and the reinforcing plies 42 and 43 all liquify under the heat and pressure of the curing process, thereby providing complete, air-free encapsulation of thermostat 38.

Preferably, hydrostatic pressure deflection cover 40 comprises the same SBR type rubber as layers 29 and 31. Nylon reinforced neoprene is preferred for reinforcing plies 42 and 43 in order that the patch plies are sufficiently compressible to prevent damage to wire assembly 32 and thermostat 38, while also being rigid enough to impart a sufficient amount of strength and rigidity to thermostat assembly 34. Hydrostatic pressure resistant cover 40, which, as previously stated, can be manufactured from a single piece of rubber or a plurality of layers of rubber, preferably has an overall tapered shape with the width of top surface 47 substantially less than the width of bottom surface 48. The use of cover 40 assures that only a small percentage of the pressure employed in the curing process is physically applied to thermostat 38, with a substantial majority of the pressure forces being absorbed by cover and diverted away from thermostat 38 to the surrounding patch plies. The tapered shape of cover 40 provides thermostat assembly 34 with an overall smooth, snag-free, low profile.

Figure 8:
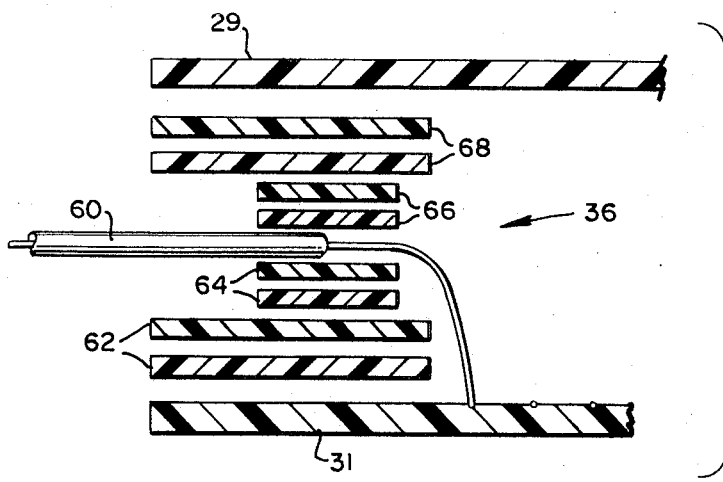
FIG. 8 is an exploded cross sectional end view of the connecting wire assembly of the water bed heater taken along line 8—8 of FIG. 2.

The assembly of water bed heater 22 is finalized by the completion of the power supply assembly 36, shown in FIGS. 2 and 8. Power supply wire 60 is connected to the two ends of the continuous heating wire assembly 32 to provide power throughout the assembly. Before curing, the safe, continuous operation of the connection between power supply wire 60 and heating wire assembly 32 is assured by thoroughly encapsulating this interconnection. The complete encapsulation is provided by positioning reinforcing or patch plies 62 directly on bottom layer 31 of the SBR type rubber, positioning supply wire fill plies 64 and 66 directly below and above the interconnection point between supply wire 60 and heating wire assembly 32, and then positioning larger reinforcing plies 68 directly above fill plies 66. In the preferred embodiment, reinforcing plies 62, 64, 66 and 68 all comprise nylon reinforced neoprene with suitably beveled edge if desired.

The assembly of water bed heater 22 is then completed by properly positioning top layer 29 of the SBR type rubber. However, before layer 29 is positioned, a liquid rubber spray is applied to bottom layer 31 in order to establish a temporary bond between layers 29 and 31 when layer 29 is positioned thereon. This temporary bond allows pin board 46 of FIG. 5 to be removed while assuring that wire assembly 32 is not disturbed.

Figure 9:
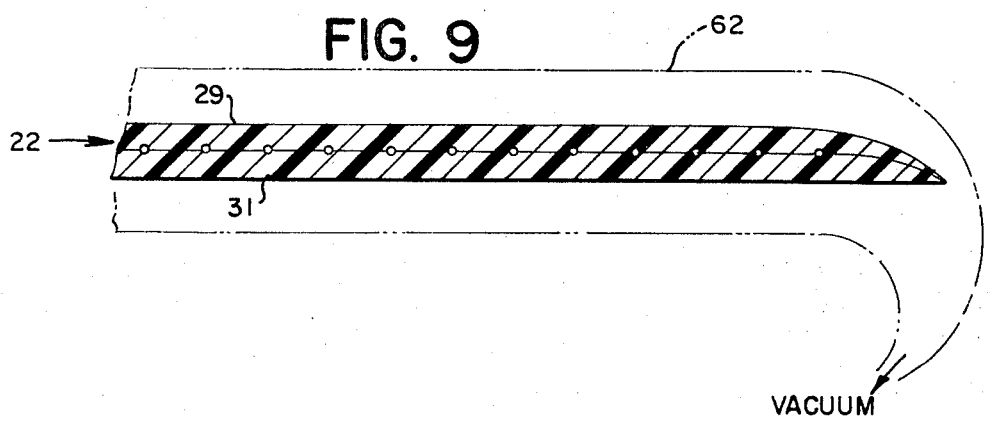
FIG. 9 is a greatly enlarged fragmentary cross-sectional end elevation view of the water bed heater of this invention, shown in a flexible container used during the curing process.

Once pin board 46 has been removed, the entire water bed heater assembly is placed in a sealed flexible container 62 which is connected to a vacuum source, as shown in FIG. 9. A vacuum is then drawn on flexible container 62, which in turn draws all of the air out from heater assembly 22, and atmospheric pressure forces the various rubber layers into intimate contact. Water bed heater 22, along with the flexible container 62, is placed in autoclave with the interior of flexible container 62 and the heater 22 still being connected to the vacuum source. While in the autoclave, the exterior of container 62 enclosing water bed heater 22 is exposed to steam pressure ranging between 60 and 100 lbs. per square inch at a temperature of about 280° F. for a period of about one hour.

Once removed from the autoclave, the cured water bed heater 22 is ready for operation. The continuous exposure to vacuum during this curing process assures that all air pockets existing between layers 29 and 31 of heater 22 are eliminated and, as shown in FIG. 9, a virtually inseparable unitary sheet of rubber is produced, having embedded heating wires sandwiched therein, and with an embedded thermostat mounted at the most desirable area thereof.

The bond between layers 29 and 31 is to secure that separation of these rubber layers is virtually impossible. This eliminates the chance of any water seapage between the layers, short circuiting the heating wire. Also, since the inseparable bond is between rubber layers 29 and 31 only, the individual wires of the eating wire assembly 32 can flex independently of their rubber sheath. Consequently, no significant stress or strain can be imposed on the wires of heating wire assembly 32 when water bed heater 22 is bent or flexed in various configurations.

The prior art water bed heaters generally employed bulky bi-metallic switching thermostats to prevent overheating. As stated above, this type of thermostat produced an undesirable bulge in the water bed heater that was prone to catching, snagging, and being torn off of the heater. The streamlined, automatic reset "tubular" thermostats employed in the water bed heater of this invention, although more desirable, could not be used because of a general inability to withstand fabrication pressures greater than 20 pounds per square inch. Any greater pressure altered the temperature sensing characteristics of the thermostat. By employing the pressure-resistant cover of this invention, this more desirable type of thermostat can be directly molded into the water bed heater and exposed to the curing steam pressure levels of 60 to 100 pounds per square inch. The pressure-resistant cover of this invention assures that the pressure physically applied to the thermostat does not exceed its maximum pressure tolerance. As a result, a water bed heater having a low profile thermostat contained therein and positioned at the most desirable sensing area results from the manufacturing process of this invention. Furthermore, the water bed heater comprises a completely air-free inseparable cured bond between the rubber layers in order to assure continuous, fail-safe operation.

It will thus be seen that the objects set forth above, among those made apparent from the preceding description, are efficiently attained, and since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for manufacturing a water bed heater comprising the steps of:
   A. arranging a heating wire assembly on an uncured layer of styrene butadiene type rubber in accordance with a desired configuration;
   B. interconnecting a thermostat to said heating wire assembly;
   C. mounting a pressure-resistant shield on said thermostat;
   D. mounting a second sheet of uncured styrene butadiene type rubber in juxtaposed relationship to said first sheet, forming an assembled water bed heater; and
   E. curing said assembled water bed heater by applying heat and pressure to bond said juxtaposed layers into a unitary laminated sheath.

2. The process defined in claim 1, comprising the additional steps of:
   F. mounting said first sheet of styrene butadiene type rubber on a pin board; and
   G. winding a continuous elongated strand of heating wire about the pins of said pin board in a particular desired configuration forming said heating wire assembly.

3. The process defined in claim 1, comprising the additional steps of:
   F. mounting a plurality of nylon reinforced neoprene plies between the thermostat and the heating wire assembly; and
   G. mounting a plurality of nylon reinforced neoprene plies juxtaposed to the thermostat cover.

4. The process defined in claim 1, comprising the additional steps of:
   F. enclosing the assembled uncured water bed heater in a flexible container;
   G. exposing the flexible container and the enclosed water bed heater assembly to vacuum; and
   H. exposing the exterior of the flexible container enclosing the water bed heater assembly to steam pressures between about 60 and about 100 pounds per square inch and to temperatures between about 250° and about 300° F., while continuously maintaining a vacuum inside said flexible container.

5. A method of forming a heating pad comprising the steps of:
   positioning a first uncured rubber sheet to receive a heating wire pattern;
   forming a heating wire pattern on said first rubber sheet;
   placing a first fiber reinforced elastomer ply over a selected part of said heating wire pattern;
   placing a crimp-set thermostat on said first fiber reinforced elastomer ply, said crimp-set thermostat being electrically connected to said heating wire pattern;
   placing a pressure distributing uncured rubber cover around and over said thermostat;
   placing a second fiber reinforced elastomer ply over said pressure distributing cover;
   positioning a second uncured rubber sheet over said first sheet to form an assembly having said heating wire pattern, thermostat and pressure distributing cover between said first and second rubber sheets;
   subjecting said assembly to a substantially evacuated environment; and
   subjecting said assembly to heat and pressure to cure said assembly without changing the setting of the thermostat and form a substantially unitary rubber sheet having said heating wires and thermostat embedded therein.

6. The method as set forth in claim 5 wherein said step of placing a pressure distributing cover around and over the thermostat includes:
   locating one or more plies of uncured rubber with central openings around said thermostat, said thermostat being within said central opening.

7. The method as set forth in claim 5 wherein said step of subjecting the assembly to an evacuated environment includes:
   placing said assembly in a container and drawing a vacuum on said container.

8. The method as set forth in claim 5 wherein said step of subjecting said assembly to heat and pressure includes:
   placing said assembly in an autoclave and exposing said assembly to a steam pressure between 60 and 100 pounds per square inch at a temperature of about 280°F for about 1 hour.

* * * * *